(12) United States Patent
Kern

(10) Patent No.: US 6,172,469 B1
(45) Date of Patent: *Jan. 9, 2001

(54) DEVICE FOR OPERATING A GAS DISCHARGE LAMP

(75) Inventor: Robert Kern, Sasbachwalden (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/836,137
(22) PCT Filed: Sep. 23, 1995
(86) PCT No.: PCT/DE95/01321
§ 371 Date: May 5, 1997
§ 102(e) Date: May 5, 1997
(87) PCT Pub. No.: WO96/14724
PCT Pub. Date: May 17, 1996

(30) Foreign Application Priority Data

Nov. 8, 1994 (DE) .................................................. 44 39 885

(51) Int. Cl.[7] ............................. H05B 41/00; H05B 41/14
(52) U.S. Cl. ............................. 315/307; 315/291; 315/82; 307/10.8
(58) Field of Search .................................... 315/307, 308, 315/291, 82; 307/10.1, 10.8

(56) References Cited

U.S. PATENT DOCUMENTS 5,498,933 * 3/1996 Nakamura ............................. 315/205

* cited by examiner

Primary Examiner—Arnold Kinkead
(74) Attorney, Agent, or Firm—Venable; Norman N. Kunitz

(57) ABSTRACT

A device for operating a gas discharge lamp (13) is proposed, having a power supply circuit which makes available an alternating voltage ($U_L$) or an alternating current ($I_L$) of a predetermined period duration ($T_P$) for the supply of the gas discharge lamp (13) with predetermined electrical power. During an intended reduction of the mean lamp rating compared to the operation at normal rating, an increase of the instantaneous power is provided within a half period duration ($T_P/2$) prior to the pole change of the alternating voltage ($U_L$) or alternating current ($I_L$). Preferably, the duration of the increase of the instantaneous power is a function of the period duration ($T_P$). The device according to the invention for operating the gas discharge lamp (13) largely prevents the arc comprised in the gas discharge lamp (13) from going out during the pole-changing process and therefore ensures reignition following the pole-changing process. A preferred application of the device according to the invention is a gas discharge lamp (13) which is installed in a motor vehicle.

9 Claims, 1 Drawing Sheet

DEVICE FOR OPERATING A GAS DISCHARGE LAMP

BACKGROUND OF THE INVENTION

The invention is based on a device for operating a gas discharge lamp having a power supply circuit which makes available an alternating voltage or an alternating current of a predetermined period duration for the supply of the gas discharge lamp with a predetermined power. From DE-A 37 15 162.2, a circuit arrangement for operating a gas discharge lamp is known comprising a voltage transformer that converts the energy made available by a direct current source to an alternating voltage of appropriate level and frequency. At control inputs, the voltage transformer receives control signals derived from the lamp voltage and from the lamp current to supply the gas discharge lamp with a predetermined electrical power. During the pole-changing process of the alternating voltage, an instantaneous power reduction occurs in the gas discharge lamp, which power reduction can lead to a short-time reduction of the arc. A sufficiently high operating frequency, which may be, for example, at a few 100 Hertz, ensures that the arc does not go out entirely during the short current zero. The required voltage after the pole-changing process for the maintenance of the arc during operation at normal rating corresponds to the normal burning voltage of the gas discharge lamp. A reduction of the electrical power supplied to the gas discharge lamp results in a total interruption of the arc during the pole-changing process. The power supply circuit must be able to come up with the necessary reignition voltage after the pole-changing process. A reduction of the electrical power supplied to the gas discharge lamp is therefore possible to the same extent that the power supply circuit is able to come up with the reignition voltage.

It is the object of the invention to provide a device for operating a gas discharge lamp which ensures a reliable operation of the gas discharge lamp in an operating phase with reduced power.

SUMMARY AND ADVANTAGES OF THE INVENTION

The above object generally is achieved according to the present invention by a device for operating a gas discharge lamp, including a power supply circuit which makes available an alternating voltage or an alternating current of a predetermined period duration for the supply of the gas discharge lamp with a predetermined power, wherein upon a desired reduction of the mean lamp operating power rating compared to the operation at normal power rating, an increase of the instantaneous power is provided within a half period duration immediately prior to the pole change of the alternating voltage or alternating current supplied to the lamp.

The device according to the invention offers the advantage that an increase of the output voltage of an existing power supply circuit is not necessary in order to accomplish a higher reignition voltage. The invention provides that, during a reduction of the mean lamp rating compared to the operation at normal rating, an increase of the instantaneous power is provided within a half period duration immediately prior to the pole change of the alternating voltage. The short-time increase of the instantaneous power prior to the pole-changing process has the effect that the necessary reignition voltage after the pole-changing process is not considerably higher compared to the operation at normal rating.

Advantageous modifications and configurations of the device according to the invention ensue from the dependent claims.

An advantageous feature provides that the increase of the instantaneous power prior to the pole-changing process corresponds to the power during operation at normal rating. In this design, a power reserve of the power supply circuit is not necessary.

In another advantageous configuration, wherein the power supply circuit can supply a power which is above the rated power, it is provided that the short-time instantaneous power is above the rated power. This measure ensures a reignition of the gas discharge lamp after the pole-changing process in all conceivable operating conditions, also taking ageing of the gas discharge lamp into account.

According to an advantageous modification, it is provided that the increase of the instantaneous power within a half period duration prior to the pole change of the alternating voltage is provided in each half period of the alternating voltage. This measure further increases the reliability of the reignition of the gas discharge lamp after the pole-changing process.

A further advantageous modification provides that the increase of the instantaneous power is implemented, in particular, by increasing the current, with the current intensity being predetermined. The current intensity determines the ionization conditions in the gas discharge lamp and therefore is an essential characteristic quantity which is of importance particularly for a pole-changing process.

A modification of the device according to the invention provides that the increase of the instantaneous power takes place a predetermined time prior to the pole-changing process, which time is a function of the period duration of the alternating voltage. This advantageous modification allows an adaptation to a different operating frequency of the gas discharge lamp.

A further modification relates to the power supply circuit which is preferably configured as voltage transformer supplying a direct voltage at its output, which direct voltage is converted to an alternating voltage in a subsequent bridge circuit in whose diagonal the gas discharge lamp is disposed.

A feature of this modification provides that the voltage transformer is a DC/DC converter fed by a battery.

The modifications of the power supply circuit which are provided according to the invention allow the realization of a highly-efficient voltage transformer which, internally, may have a considerably higher clock frequency than the alternating voltage that is supplied to the gas discharge lamp. The comparatively low-frequency alternating voltage having a frequency of, for example, a few 100 Hertz, is generated in the bridge circuit.

The device according to the invention is particularly suited for operating a metal-doped high-pressure gas discharge lamp which is critical with respect to the need for reignition after the arc has gone out. A preferred application of the high-pressure gas discharge lamp, particularly of the metal-doped high-pressure gas discharge lamp, is the use in a headlight of a motor vehicle.

Further advantageous modifications and features of the device according to the invention for operating a gas discharge lamp ensue from further dependent claims and from the following description.

BRIEF DESCRIPTION OF THE DRAWING

FIG. 1 shows a voltage transformer 10 which converts an electrical power supplied by a power source 11, which has a voltage value $U_B$, to a corresponding output-side power having a predetermined output voltage $U_A$ or a predetermined output current $I_A$. The output voltage $U_A$ is supplied to a bridge circuit 12 at whose output a lamp voltage $U_L$ appears which is provided to supply a gas discharge lamp 13. A lamp current flowing through the gas discharge lamp 13 is identified by $I_L$.

Figure 1:
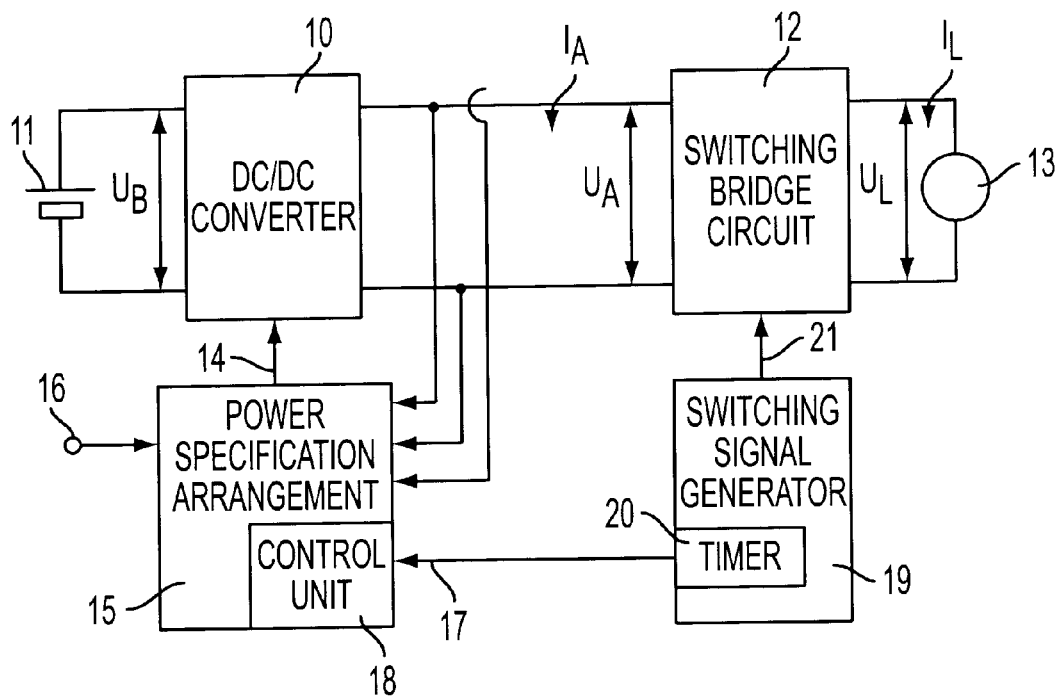
FIG. 1 illustrates a block diagram of a device according to the invention.

The voltage transformer 10 is fed a control signal 14 made available by a power specification arrangement 15. The power specification arrangement 15 determines the control signal 14 as a function of a predetermined power 16, the captured output current $I_A$, the captured output voltage $U_A$ and a start signal 17. The start signal is supplied to an arrangement 18 comprised in the power specification arrangement 15 for the purpose of increasing the desired power value. The start signal 17 is made available by a timer 20 included in a switching signal generator 19. A switching signal 21 generated by the switching signal generator 19 is fed to the bridge circuit 12.

Figure 2:
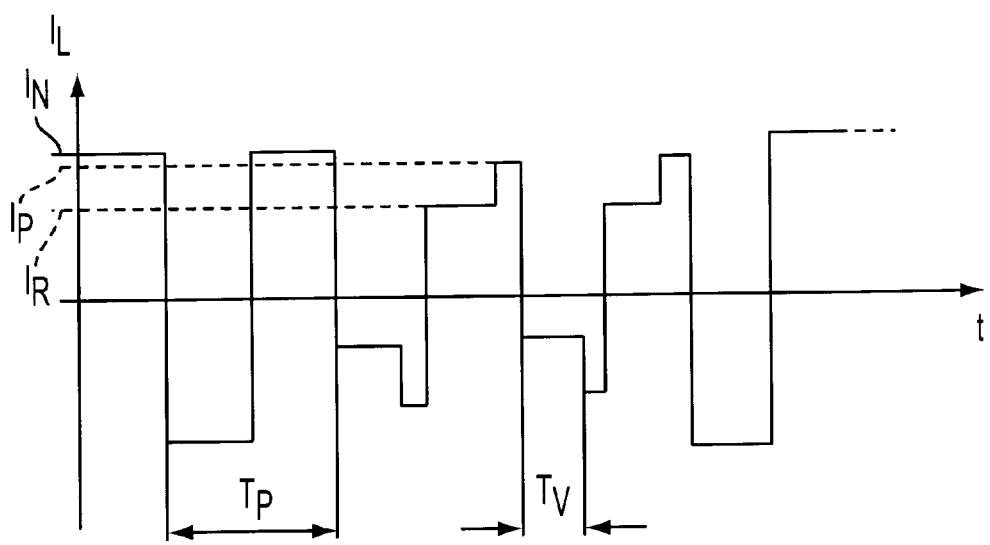
FIG. 2 illustrates a signal pattern appearing in the block diagram according to FIG. 1 as a function of the time.

FIG. 2 shows the lamp current $I_L$ as a function of the time t. The lamp current $I_L$ has an at least approximately rectangular-shaped signal pattern, with the period duration $T_P$ being set. A first current level corresponds to a rated current $I_N$, a second current level corresponds to a reduced current $I_R$ and a third current level corresponds to a pulse current $I_P$. The pulse current $I_P$ appears within a half period duration $T_P/2$ after a delay time $T_V$.

The arrangement illustrated in FIG. 1 is explained in greater detail by way of the path of the lamp current $I_L$ shown in FIG. 2 as a function of the time t:

Together, the voltage transformer 10, the bridge circuit 12 as well as the power specification arrangement 15 and the switching signal generator 19 form a power supply circuit for the gas discharge lamp 13. The voltage transformer 10 converts the power supplied by the power source 11 to a predetermined output voltage $U_A$ and/or a predetermined output current $I_A$. The power source 11 preferably is a battery with an impressed voltage $U_B$. The voltage transformer 10 preferably is a direct voltage/direct voltage (DC-DC) converter which converts the voltage $U_B$, which is a direct voltage if a battery is the power source 11, to a generally higher output voltage $U_A$ which is also a direct voltage. The downstream bridge circuit 12 has the task of converting the direct voltage $U_A$ to a lamp voltage $U_L$ suitable for supplying the gas discharge lamp 13. An alternating voltage is suitable which prevents material transport effects in the gas discharge lamp 13 as well as uneven wear of the electrodes. The bridge circuit 12 comprises, for example, four semiconductor power elements wired as H-bridge in whose diagonal the gas discharge lamp 13 is arranged. The bridge circuit 12 is switched with the switching signal 21 in such a manner that the output voltage $U_A$ of the voltage transformer 10 is applied, alternating in polarity, to the two electrodes of the gas discharge lamp 13. The frequency which is, for example, a few 100 Hertz, is determined by the switching signal 21. The configuration of the voltage transformer as a DC-DC converter whose output voltage $U_A$ is converted with the bridge circuit 12 to an alternating voltage, offers the advantage that the internal clock frequency of the DC-DC converter 10 can be significantly higher than the frequency of the switching signal 21. The voltage transformer 10 can have an internal clock frequency of a few 100 kilohertz.

The voltage transformer 10 can impress either the output voltage $U_A$ or the output current $I_A$ with the gas discharge lamp 13 as load. The respectively other quantity is fixed by the internal resistance of the gas discharge lamp 13. Preferably, the output current $I_A$ is impressed since the gas discharge lamp 13 is designed for specific currents. In its amount or value, the output current $I_A$ corresponds to the lamp current $I_L$. Likewise, the output voltage $U_A$ and the lamp voltage $U_L$ correspond with respect to their amounts.

For the predetermination of a specific power, the power specification arrangement 15 is provided which emits a corresponding control signal 14 to the voltage transformer 10. The power specification arrangement 15 receives the power to be predetermined from the power specification 16 as a desired value. The actual power value is determined from the captured output voltage $U_A$ and the captured output current $I_A$. The potentially necessary sensors are not indicated in detail in FIG. 1.

During the operation at normal rating of the gas discharge lamp 13, the amplitude of the lamp current $I_L$ amounts to, for example, the value of the rated current $I_N$ indicated in FIG. 2. The lamp current $I_L$ has a rectangular-shaped signal pattern having a period duration $T_P$ which is predetermined by the switching signal 21. During the pole-changing process, during which the lamp current $I_L$ and the lamp voltage $U_L$ pass through zero, a more or less pronounced reduction of the arc appearing in the gas discharge lamp 13 occurs as a function of the prevailing operating data of the gas discharge lamp 13. In the extreme case, the arc may go out totally after the pole-changing process. During operation of the gas discharge lamp 13 at normal rating, in which, for example, the rated current $I_N$ is flowing, there is generally no considerable increase of the reignition voltage after the pole-changing process. In order to ensure a reliable reignition of the lamp after a pole-changing process, even in a reduced power mode of the gas discharge lamp 13 during which, for example, the reduced current $I_R$ is flowing, it is provided according to the invention that immediately prior to the pole-changing process of the lamp voltage $U_L$, an increase of the instantaneous power takes place within a half period duration $T_P/2$. To increase the instantaneous power, for example, the voltage or, in particular, the current can be increased. In the illustrated embodiment, the lamp current $I_L$ is increased to the pulse current $I_P$ compared to the reduced current $I_R$ before pole-changing. This measure reduces the reignition voltage after an extinction of the arc in the gas discharge lamp 13 which might have occurred following the pole-changing process. The pulse current $I_P$ can be selected to be, for example, identical to the rated current $I_N$ With this design, the voltage transformer 10 does not have to have any current reserves. Preferably, the pulse current $I_P$ is above the rated current $I_N$ by a predetermined amount, with it being necessary that the voltage transformer 10 is able to supply the increased pulse current $I_P$. This measure accomplishes greater reliability. Furthermore, it may be provided that, in each half period duration $T_P/2$, a short-time increase of the instantaneous power is provided immediately prior to the pole-changing process. This measure further increases the reliability of reignition. The information as to the moment at which the instantaneous power must be increased can be communicated to the power specification arrangement 15 by the switching signal generator 19. The switching signal generator 19 has the information on the period duration $T_P$ and the condition of the pole-changing processes. The start signal 17 is emitted to the power specification arrangement, for example, a fixedly predetermined amount of time prior to the pole-changing process. The start signal 17 effects an increase of the desired value via the arrangement for increasing the desired power value. The predetermined time may be fixed, for example, by the timer 20 in the switching signal generator 19. The timer 20 may be started, for example, by a pole-changing process and emits the start signal 17 after the predetermined delay time $T_V$ has expired.

According to a preferred modification it is provided that the delay time $T_V$ depends on the period duration $T_P$. Thus, the time duration for increasing the instantaneous power by increasing from the reduced current $I_R$ to the pulse current $I_P$ can be controlled with regard to time as a function of the period duration $T_P$. This results in an adaptation to the operating behavior of the gas discharge lamp 13, with it being more probable that the arc will go out if the period duration $T_P$ is made longer. The adaptation takes place such that, in case of an increase of the period duration $T_P$, the delay time $T_V$ is increased less than proportionally. This increases the period duration of the instantaneous power increase within the half period duration $T_P/2$.

A metal-doped high-pressure gas discharge lamp, for example, is provided as a gas discharge lamp 13. Such a gas discharge lamp is suited as headlight lamp which is used, for example, in a motor vehicle.

What is claimed is:

1. A device for operating a gas discharge lamp, having a power supply circuit which makes available an alternating voltage or an alternating current of a predetermined period duration for the supply of the gas discharge lamp with a predetermined power means, responsive to a desired reduction of a mean lamp power rating operation compared to operation at a normal power rating, for causing an increase of instantaneous power provided within a half period duration ($T_P/2$) immediately prior to a pole change of the alternating voltage ($U_L$) or alternating current ($I_L$).

2. A device according to claim 1, wherein the increase of the instantaneous power is provided up to a rated power.

3. A device according to claim 1, wherein the increase of the instantaneous power is provided to exceed the value of a rated power.

4. A device according to claim 1, wherein the increase of the instantaneous power is provided within each half period duration ($T_P/2$) prior to the pole change of the alternating voltage ($U_L$) or of the alternating current ($I_L$).

5. A device according to claim 1, wherein a duration ($T_P/2-T_V$) of the increase of the instantaneous power is a function of the period duration ($T_P$).

6. A device according to claim 1, wherein the power supply circuit comprises a voltage transformer (10) having a direct voltage output and a subsequent bridge circuit (12) in whose diagonal the gas discharge lamp (13) is disposed.

7. A device according to claim 6, wherein a battery is provided as power source (11) and the voltage transformer (10) is configured as a direct voltage/direct voltage converter.

8. A device according to claim 1, wherein a metal-doped high-pressure gas discharge lamp is provided as the gas discharge lamp (13).

9. A device according to claim 8, wherein the device is mounted and used in a motor vehicle.

* * * * *